United States Patent [19]

Landry

[11] 4,258,922

[45] Mar. 31, 1981

[54] COMPUTER MATH GAME

[76] Inventor: Alfred E. Landry, 52 Bayberry Cir., Liverpool, N.Y. 13088

[21] Appl. No.: 942,330

[22] Filed: Sep. 14, 1978

[51] Int. Cl.³ .......................... A63F 3/00; G09B 19/02
[52] U.S. Cl. .................................. 273/302; 273/236; 273/272; 273/146; 434/118
[58] Field of Search ................... 35/31 G, 31 F, 31 R; 273/236, 272, 296, 299

[56] References Cited

U.S. PATENT DOCUMENTS

| | | | |
|---|---|---|---|
| 438,757 | 10/1890 | Bliss | 35/31 F |
| 1,300,315 | 4/1919 | Wilder | 273/249 |
| 1,319,561 | 10/1919 | Brenner | 273/272 |
| 3,314,168 | 4/1967 | Heckman | 135/31 G |
| 3,523,377 | 8/1970 | Gardner | 273/299 |
| 3,663,021 | 5/1972 | Whippo | 273/296 |
| 3,844,564 | 10/1974 | Barish | 273/238 |
| 4,114,290 | 9/1978 | Cooper | 35/31 R |

FOREIGN PATENT DOCUMENTS 1461664  10/1965  France ........................ 273/299

*Primary Examiner*—Richard C. Pinkham
*Assistant Examiner*—Scott L. Brown
*Attorney, Agent, or Firm*—Charles S. McGuire

[57] ABSTRACT

A game for both entertainment and education intended to increase familiarity and facility with binary mathematics and typical logic functions of the type normally carried out by digital computers. Two or more players each select by random chance a succession of binary digits. Instructions for operations to be performed on the digit sequence are likewise selected at random by the players, such operations being of the types typically performed in the arithmetic logic unit of a digital computer. In one embodiment of the invention, each digit in the sequence is temporarily recorded by each player on game board apparatus and is changed in accordance with the operations performed as the game progresses. A wide variety of game rules may be devised for carrying out adversary type games and determining a winner.

4 Claims, 10 Drawing Figures

COMPUTER MATH GAME

BACKGROUND OF THE INVENTION

The present invention relates to educational games and, more specifically, to games involving binary mathematics and logic functions performed by the game participants of the type normally performed in digital computers.

Computers play an ever-increasing role in the conduct of the affairs of virtually everyone in the country. The functions of digital computers are based upon logic and arithmetic operations which recognize two states, e.g., on-off, high-low, magnetized-non-magnetized. The two states are assigned respective meanings which relate to the operation being performed, e.g., true-false, 1-0, etc. While overall computer construction, operation and programming can be very complex and highly technical, the basics of binary mathematics and the various manipulations of the digit sequences which implement the logic and arithmetic operations may be learned by persons of all ages having basic numerical familiarity.

Thus, it is both desirable and feasible to provide a simple and enjoyable means for learning the basics of binary mathematics and typical computer operations, which is the principal object of the present invention.

A further object is to provide a general game format, subject to many variations in rules and game procedure, which familiarizes the players with binary numbers and computer-type manipulation thereof.

Another object is to provide a novel game board and associated random chance selection means for playing games involving binary digit sequences and basic computer-type operations thereon.

A still further object is to provide instructional games which may be implemented with simple and inexpensive playing pieces such as cards, dice, playing board, and the like, involving no electrical or electronic parts, yet which are effective to convey a knowledge of basic digital computer operation.

Other objects will in part be obvious and will in part appear hereinafter.

SUMMARY OF THE INVENTION

In accordance with the foregoing objects, the invention includes first random chance means by which the players select binary digits which are arranged in the sequence selected to form a binary number of, e.g., four digits. According to all or most of the contemplated game rules, the first random chance means will be utilized by each player to select two binary members having the specified number of digits. Second random chance means are then utilized to select an instruction for an operation to be performed on the numbers. Instructions among the group from which the selection is made may be of the arithmetic type, e.g., add, subtract, etc., the logical type, e.g., AND, OR, NOR, etc., or both.

In one form of the invention a deck of cards is printed with a "1" on one side of each card and a "0" on the other. The cards are mixed in a random manner so that either face of each card may be uppermost when the deck is placed on the playing surface. Cards are drawn by the two or more players alternately or sequentially, according to the particular rules being followed, and arranged in the order drawn to represent the digit sequence.

When the instruction is selected it is implemented by operating upon the previously established digit sequences accordingly. The digits representing the binary number after the operations is performed are recorded by drawing additional cards from the deck and placing them with the proper side up in correct sequence with respect to the previously selected numbers. Play continues by random draw of additional numbers and/or performing additional operations according to further randomly selected instructions according to the particular game rules being followed until the game is concluded and a winner established. If desired, a second deck of cards, printed on one side only with either a "1" or a "0" may be provided for use in games where the numbers selected by the respective players are not to be shown to the other players, e.g., until the selected instruction is executed.

In other embodiments, the first random chance means comprise a set of three dice each printed with spots or pips on five sides, representing numbers from one to five, and one blank side, representing zero, so that the total on the upper surfaces of the three dice will be a number from zero to fifteen. This can be represented in binary form by a four digit number. Likewise, a spinning pointer on a board divided into segments may be used to select either the binary numbers, the instructions, or both. In cases where the random chance means is something other than cards, which may themselves be arranged to indicate the selected number, a game board of unique construction provides a digital display which may be altered as desired by the players.

DETAILED DESCRIPTION

As previously indicated, the games may be played according to a wide variety of specific rules within the general format provided by the present invention while using the same, or essentially the same, basic equipment. This includes in all cases first and second random chance means for selecting binary digits or digit sequences and instructions for operations to be performed thereon. For example, both the first and second chance means may comprise playing cards identical except for the indicia printed thereon.

Figure 1:
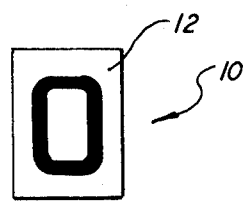
FIGS. 1 and 2 represent playing cards which may be used to implement the games with which the invention is concerned.
Figure 2:
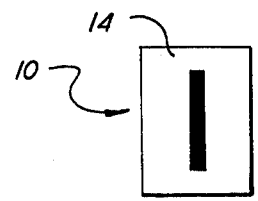

It has been found expedient where playing cards are used as the random chance means to provide a deck wherein each card is printed on one side with a "0" and on the other with a "1". Thus, FIGS. 1 and 2 respresent the same card 10 printed on surface 12 with a "0" and on surface 14 with a "1". According to a variation of the game which will be explained later, a second deck may be provided wherein the cards are printed on one side only, half with a "0" and half with a "1", the opposite surfaces of all cards being identically printed with any desired pattern or other material having no function in the game, as with the usual playing cards, or left blank. It is preferable in any case, as will become apparent, to provide a deck of the first-mentioned type wherein all cards are printed with binary digits on both surfaces.

The second random chance means may also comprise a deck of cards preferably printed on one side only with indicia representing an instruction for an operation of types normally performed in digital computers. While each card carries only a single instruction, the various cards in the deck carry a plurality of such instructions, preferably coded or abbreviated in the same fashion as is typical in computer notation. Such cards are not illustrated since they may be identical to card 10 except for the printed indicia and each of the coded instructions to be carried thereon are illustrated in FIG. 3.

It is contemplated that the second random chance means will include a small number of the more basic and typical of the many kinds of operations performed by digital computers, which recognize and distinguish between only two states whereby all mathematical operations are performed with binary numbers. The instructions used in the various games played within the general format of the invention may comprise one or more of the following types: 1. logical, 2. shift/rotate, and 3. arithmetic. For example, six different logical, four shift/rotate and four arithmetic instructions may be included among the possible selections.

Figure 3:
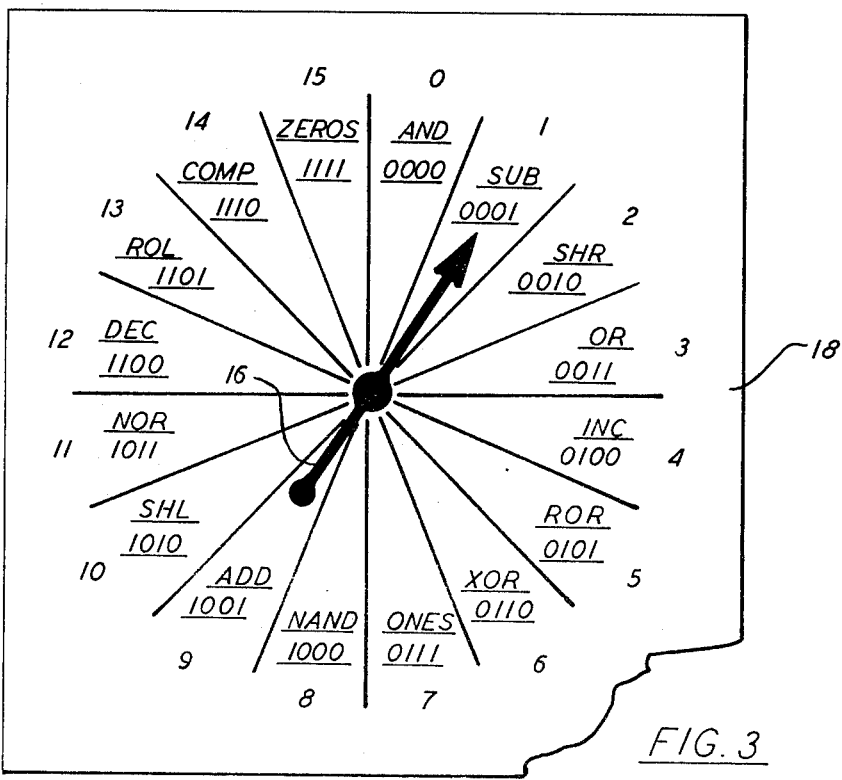
FIG. 3 is a spinning pointer comprising alternate random chance means for playing the games.

Referring to FIG. 3, a second type of conventional random chance selection means is shown, comprising pointer 16 pivotally mounted upon board 18. Pointer 16 is manually set in motion and will randomly come to a stop with the pointed end superposed with one of the sixteen segments into which board 18 is evenly divided. In the illustrated embodiment, six logical instructions are AND, OR, NAND (not and) NOR (not or), exclusive or (XOR), and complement (COMP). The four shift/rotate instructions are SHL (shift left), SHR (shift right), ROL (rotate left), and ROR (rotate right). The four arithmetic operations are ADD, SUB (subtract), INC (increment) and DEC (decrement).

The two additional segments are indicated ONES and ZEROS, indicating multiple instructions which when executed result in all digits in the sequence being changed to all ONES or all ZEROS. Although these latter two may be omitted and board 18 printed in only fourteen segments, it may be expedient to use the spinning pointer as the first as well as the second random chance means. In such cases, each segment is printed, in addition to the various instructions, with a binary digit or number. In the illustrated embodiment the segments are printed with four digit binary numbers from zero to fifteen, the highest number which may be represented by four binary digits. In this manner, a four digit number is selected by a single spin rather than by drawing four successive cards, or by multiple operation of other random chance means.

Figure 4:
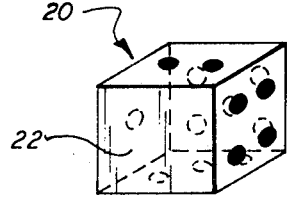
FIG. 4 is a perspective view of a die printed in a particular manner for use in playing the games.
Figure 10:
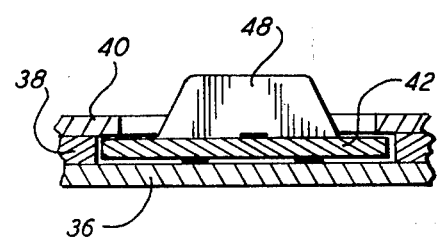
FIGS. 9 and 10 are fragmentary sectional views on the lines 9—9 and 10—10, respectively, of FIG. 5.

In FIG. 4 is shown a die 20 having one surface 22 which is blank and the other five carrying spots or pips from one to five. Three of such dice may be cast simultaneously with the total number of pips on the upper surfaces totaling a number between zero and fifteen. Such number, expressed in four digit binary form, provides the digit sequences selected by the first random chance means. Of course, a single die could be printed on three sides with a "0" and on the other three with a "1", and cast multiple times to establish each digit individually and sequentially.

Where the random chance means are in the nature of playing cards, it is convenient to arrange the cards themselves before the player drawing them to provide a temporary indication of the number(s) he has selected or the results of operations upon such numbers. Where other means, such as a spinning pointer or dice are used, it is desirable to provide additional equipment in the nature of a game board for temporarily recording the numbers as the game progresses. A preferred form of such game board is shown in FIGS. 5-10, to which reference is now made.

Figure 5:
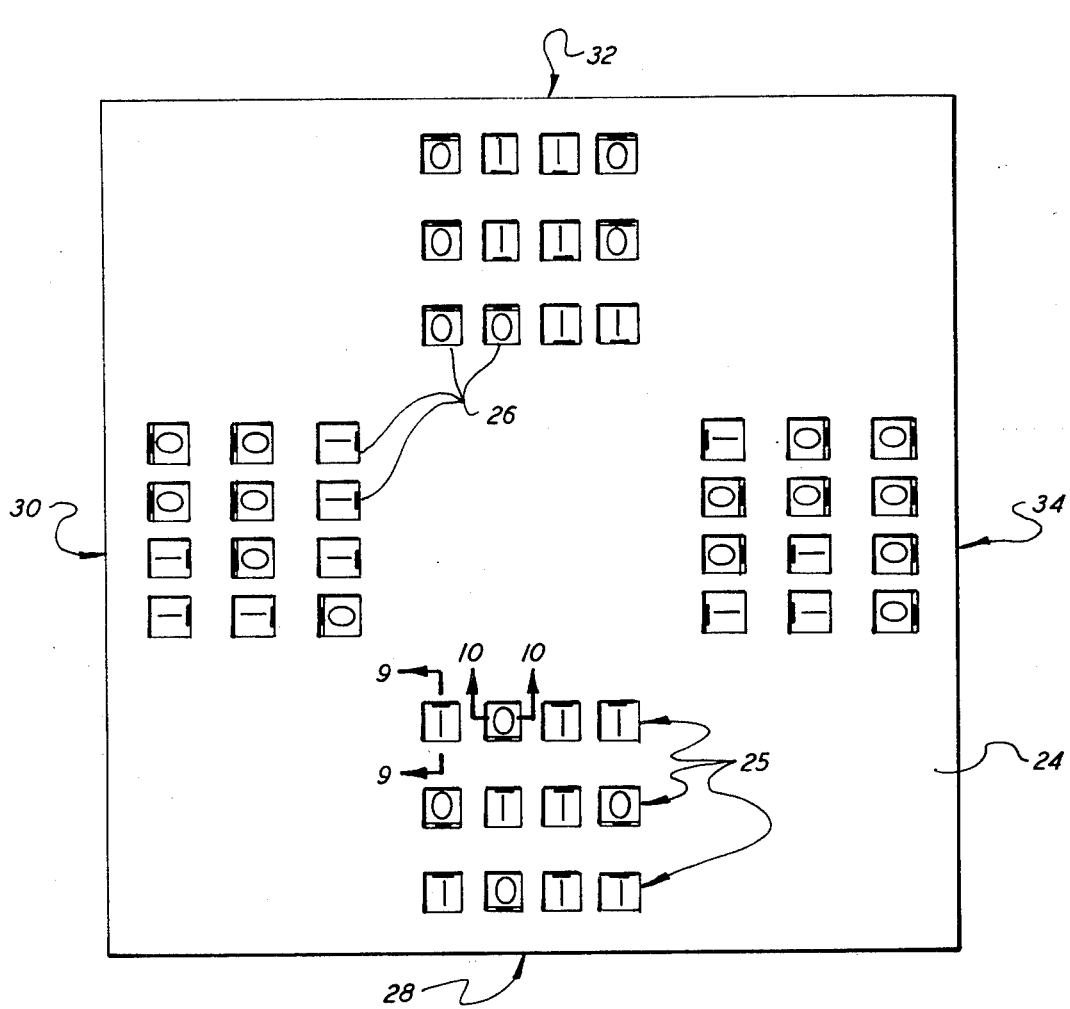
FIG. 5 is a plan view of game board apparatus which may be used in conjunction with the games.

The game board in its finished form is illustrated in FIG. 5 and denoted generally by reference numeral 24. Although it is obvious that board 24 may be constructed to provide, within practical limits, as many player and digit indicating positions as desired, the illustrated form has a player position on each of the four sides, each player position having three rows 25 of digit display positions of four digits each. As explained in the following paragraphs, board 24 is so constructed that either a "0" or a "1" is visible at each of the twelve digit display positions, some of which are indicated by reference numeral 26, at each of the player positions, generally indicated at 28, 30, 32 and 34.

Figure 6:
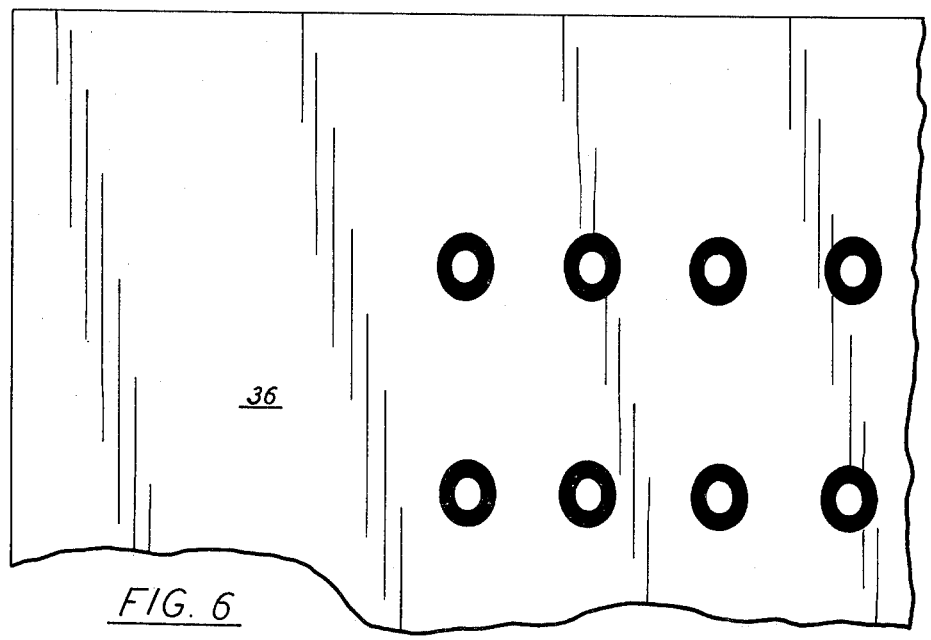
FIGS. 6-8 are fragmentary plan views of portions of separate layers of which the game board of FIG. 5 is composed.
Figure 9:
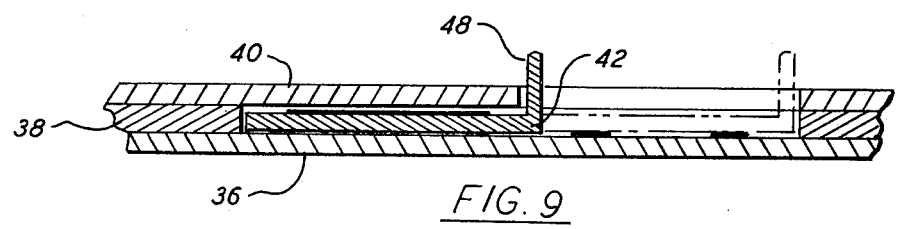
Figure 8:
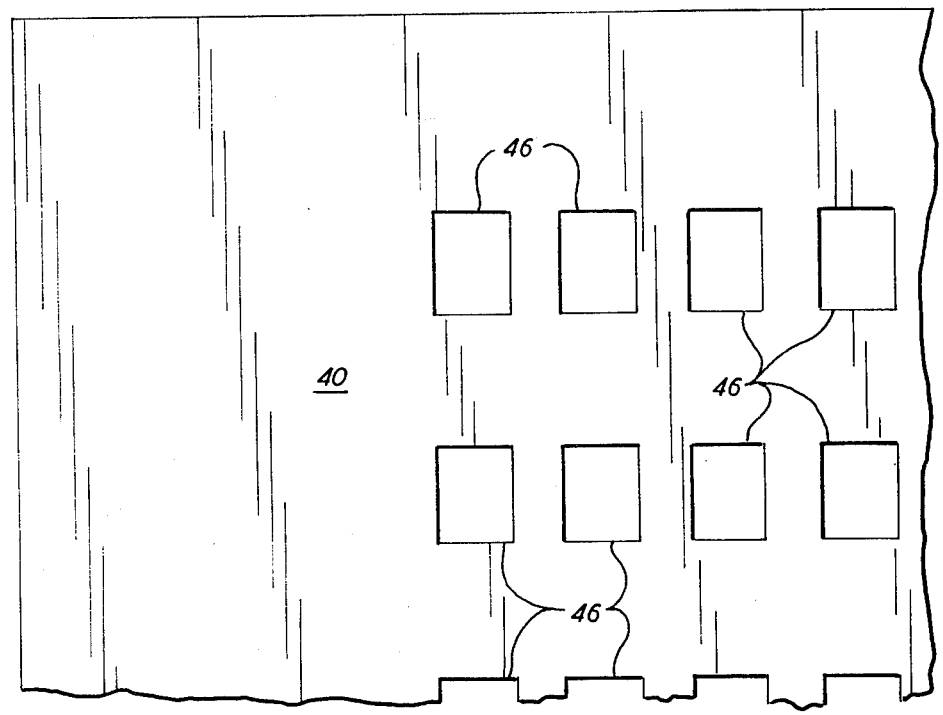
Figure 7:
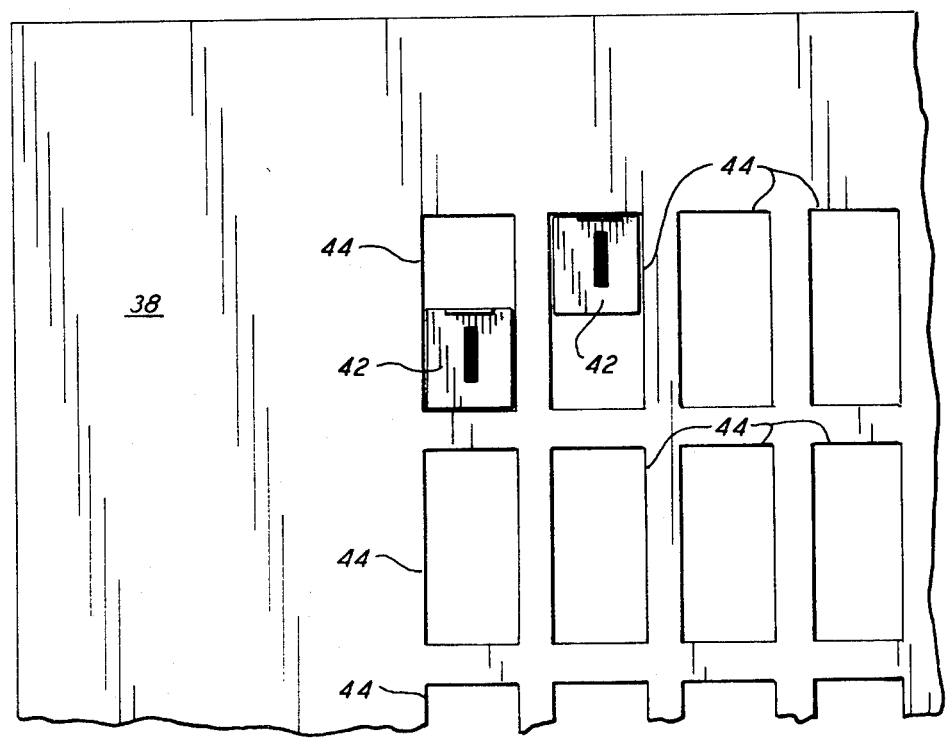

Game board 24 is made up of a base layer 36, an intermediate layer 38 and an upper or cover layer 40, each preferably of heavy paperboard or plastic, with individual, slidingly movable, digit indicating members 42 retained between the base and cover layers. As seen in FIG. 6, base layer 36 is a continuous sheet printed at each digit position with a "0". Intermediate layer 38, as shown in FIG. 7, is formed with rectangular cut-out areas 44 one end of which overlies the "0" on base layer 36 at each digit position when intermediate layer 38 is superposed with and affixed to base layer 36. Cut-out areas 46 are formed in cover layer 40, as shown in FIG. 8, to overlie the ends of cut-out areas 44 through which the printed "0"s on base layer 36 are exposed. Cut-out areas 46, while large enough that the "0"s on the base layer are fully visible therethrough, are slightly less than half as long and also slightly narrower than cut-out areas 44.

After base and intermediate layers 36 and 38 have been assembled in the indicated manner, an individual digit indicating member 42 is placed within each of cut-out areas 44, the members being of approximately the same width and slightly more than one-half the length of areas 44. Each of members 42 carries a printed "1" on the upwardly facing surface thereof and an upwardly extending tab 48 along one edge. After members 42 have been placed in cut-out areas 44, cover layer 40 is superposed with and glued or otherwise affixed to intermediate layer 38. Due to the relative sizes of members 42 and cut-out areas 44 and 46, the members will be retained between the base and cover layers, being slidably movable within cut-out areas 44 by manual engagement of tabs 48. When members 42 are moved to the end of area 44 which is aligned with area 46, the "1" will be visible and the "0" will be covered; when members 42 are moved to the opposite ends of cut-out areas 44, the "0"s on base layer 36 are visible through the two superposed cut-out areas 44 and 46, members 42 and the "0"s printed thereon being concealed under cover layer 40.

From the foregoing, it is apparent that the games which are encompassed by the invention may be played with a variety of game apparatus including at least first and second random chance means for selection of each players' binary digits and instructions for operations to be performed thereon. Although a virtually infinite variety of game rules may be devised within the general framework of the invention, it is contemplated that a game set would include a set of printed rules for several games, encourging the players to devise additional game rules as their skills develop. It is also contemplated that instructional materials will be included to explain the nature and implementation of each of the operations to be performed on the numbers in terms which can be readily understood by individuals having a basic understanding of numbers, but not necessarily any prior familiarity with binary mathematics on the computer-type operations which are performed in the course of the games.

Although no explanation need be included here concerning the meaning or nature of the various operations, with which many persons are already familiar, an illustrative example of the game rules and implementation thereof will be given for a fuller understanding of the underlying principles of the invention.

Materials: Single deck of data cards, each printed on one side with a "1" and on the other side with a "0". Single deck of instruction cards including the instructions AND, NAND, OR, NOR and XOR.

Number of Players: Two or more.

Directions: Players decide who starts first and randomly mix the two decks of cards which are separately placed in position for each player to draw cards therefrom.

Step 1: Each player in turn draws four successive data cards and arranges them in a straight row, successively from left to right in the order drawn and without turning them over.

Step 2: Each player in turn draws four more successive data cards and arranges them in a second row, immediately below the first.

Step 3: Player 1 draws one instruction card from the top of the deck and places it face up on the table.

Step 4: Each player draws four additional data cards and arranges them in a third row, immediately below the second, turning the proper side of each card up to indicate the execution of the indicated instruction on his two previously selected digit sequences. The third row of data cards now becomes the first digit sequence for the next round.

Step 5: Each player draws four additional data cards, placing them face up in the sequence drawn to indicate the second new digit sequence. (After the third row of data cards, indicating implementation of the first instruction, have been placed as required, the first two rows of cards may be returned to the deck and reshuffled.)

Step 6: Player 2 draws one instruction card from the top of the deck and places it face up on the table.

Step 7: Repeat Step 4, establishing a new digit sequence reflecting implementation of the second instruction.

Step 8: Repeat Step 5, establishing an additional digit sequence to go with the one established by Step 7.

Step 9: Repeat Steps 6, 7 and 8 until a total of five instruction cards have been drawn and executed. The player whose final digit sequence indicates the highest number is the winner.

| Example: | Player 1 Data Cards | Instruction Cards | Player 2 Data Cards |
| --- | --- | --- | --- |
| Step 1 | 1 0 1 1 | | 1 0 0 0 |
| Step 2 | 0 1 0 0 | | 1 0 1 1 |
| Step 3 | | OR | |
| Step 4 | 1 1 1 1 | | 1 0 1 1 |
| Step 5 | 0 1 1 0 | | 0 0 0 1 |
| Step 6 | | AND | |
| Step 7 | 0 1 1 0 | | 0 0 0 1 |
| Step 8 | 1 1 0 1 | | 0 1 0 1 |
| Step 9 | | XOR | |
| | 1 0 1 1 | | 0 1 0 0 |
| | 1 1 1 0 | | 0 0 0 0 |
| | | NOR | |
| | 0 0 0 0 | | 1 0 1 1 |
| | 1 0 1 1 | | 1 1 1 1 |
| | | NAND | |
| | 1 1 1 1 | | 0 1 0 0 |

Player 1 wins, having a final binary number of fifteen, as opposed to player 2's four.

The rules and sequence of play would be the same, of course, if alternate random chance means and/or the game board are used instead of the cards. Special rules or instructions are provided for games in which arithmetic operations are performed. For example, the rules could provide that if, when adding two numbers, the total exceeds four binary digits, the carry bit at the left is lost. Similarly, the rules would explain what happens when subtracting a larger number from a smaller number, i.e., where a negative answer would result. The shift, rotate, increment and decrement operations may be performed only with respect to the last digit sequence selected since they represent operations on a single number only. In games utilizing only these operations, obviously only a single digit sequence need be selected before the instruction is selected and implemented. Among the many possible variations are those wherein each player selects by random chance his own instructions; each player selects by random chance at the outset a plurality of instructions and is allowed to implement them in any order to play for maximum score; each player is allowed to arrange the sequence of his selected digits in any desired sequence, and so on.

For more advanced players, the game board could be made to include, e.g., two or more additional digit positions in each row so that carries or borrows could be used and the sign (+ or −) of the number indicated at the left of the digit sequence. Also, obviously, any desired number of rows of digit sequences could be provided, within practical limits. It is further apparent that each player could use an individual game board rather than providing a single board with a plurality of player positions.

What is claimed is:

1. An instructional game involving logic functions performed on binary numeral sequences comprising the steps of:

(a) selection by each of two or more players from a randomly oriented deck of data cards printed on one side only, some with a "0" and some with a "1", the deck being shuffled and placed face down, of at least one sequence of binary digits which is recorded by placing the selected cards face up in the sequence selected;

(b) selection by random chance means of at least one instruction from a plurality of different instructions for an operation to be performed on said digits, said operation being a logic function of a type commonly carried out by a digital computer upon a digit sequence;

(c) drawing from a second deck of cards, each printed with a "0" on one side and a "1" on the other, a plurality of cards and placing said cards in proper sequence and with the proper side up to represent said sequence of digits after said operation is performed; and (d) repeating at least two of the foregoing steps one or more times in accordance with preselected game rules until the game is concluded and a winner selected as determined by said rules.

2. The invention according to claim 1 wherein said random chance means comprises a deck of command cards each printed on at least one side with one of said instructions, said command card deck being shuffled and at least one card drawn therefrom to establish said instruction.

3. The invention according to claim 1 wherein said random chance means comprise a spinning pointer on a board divided into segments printed with said instructions.

4. The invention according to claims 1, 2 or 3 wherein said plurality of different instructions include at least the logic functions AND, OR, NAND and NOR.

* * * * *